United States Patent [19]

Avarne

[11] Patent Number: 5,323,465
[45] Date of Patent: Jun. 21, 1994

[54] ACCESS CONTROL

[75] Inventor: Simon A. B. Avarne, Liphook, England

[73] Assignee: Racal-Datacom Limited, Bracknell, United Kingdom

[21] Appl. No.: 72,617

[22] Filed: Jun. 4, 1993

[30] Foreign Application Priority Data

Jun. 10, 1992 [GB] United Kingdom ............... 9212266

[51] Int. Cl.$^5$ ............................................. H04L 1/00
[52] U.S. Cl. ....................................... 380/23; 380/25; 380/46
[58] Field of Search ................... 380/23, 24, 25, 46

[56] References Cited

U.S. PATENT DOCUMENTS

| | | | |
|---|---|---|---|
| 3,906,460 | 9/1975 | Halpern | 380/23 |
| 4,575,621 | 3/1986 | Dreifus | 380/23 |
| 4,650,975 | 3/1987 | Kitchener | 380/23 |
| 4,736,419 | 4/1988 | Roe | 380/23 |
| 4,897,975 | 1/1990 | Pollard et al. | 380/23 |
| 5,014,311 | 5/1991 | Schrenk | 380/23 |
| 5,056,141 | 10/1991 | Dyke | 380/23 |
| 5,136,644 | 8/1992 | Audebert et al. | 380/23 |

FOREIGN PATENT DOCUMENTS 2241599A 4/1991 United Kingdom .
2244831A 11/1991 United Kingdom .

*Primary Examiner*—David C. Cain
*Attorney, Agent, or Firm*—Anna E. Mack

[57] ABSTRACT

A plurality of portable tokens are issued e.g. for authenticating instructions within an electronic banking network. Each token requires entry of a respective password in order to operate and becomes locked if a number of incorrect password entries are made. Each token also stores a respective cryptographic key and a random number generator. In order to unlock a locked token it outputs a random number and also encrypts that number under its respective key but does not output the result of the encryption. The random number is transmitted by the user to a central authority which stores the keys for all tokens. The authority encrypts that number under the respective key and returns the result of the encryption to the user of the token. The returned number is entered into the token and if it agrees with the result of the internal encryption the token is unlocked.

3 Claims, 2 Drawing Sheets

ACCESS CONTROL

BACKGROUND

The present invention relates generally to the field of electronic access control and more particularly to systems in which respective users are equipped with portable code-generating tokens into which a personal identification number (PIN) or other password corresponding to a respective user account must be entered in order for the token to perform an operation for that account. That operation may in turn be, for example, the generation of a "dynamic password" for use in gaining access to a data network or the generation of a "digital signature" for use in the authorisation of a financial transaction, (as known e.g. in the case of the tokens marketed by the present applicant under the trade mark WATCHWORD). The purpose of the initial password entry is of course to ensure that any such token can be used only by a person authorised to do so. It is also necessary to ensure that the correct password cannot be discovered by an unauthorised person through repeated trial and error. For this reason it is conventional to programme such tokens to become inoperative (or "locked") in response to a predetermined number of consecutive incorrect password entries and once a token has become locked in this way it will remain so even if the correct user account password is subsequently entered. While this is of great value for the prevention of fraud in the event that a token falls into unauthorised hands it is equally of great inconvenience should a token become locked in the hands of an authorised user through the inadvertent repeated entry of an incorrect password, and some means must be provided for unlocking the token in such circumstances.

The conventional technique for unlocking an inadvertently locked token is to enter a separate "master" password which the token (and others used by the same organisation) has been programmed to recognise as overriding its locking function. Since knowledge of this "master" password would prejudice the security afforded by the locking function it is imperative that it is itself kept secret. In practice, therefore, it is usual for this "master" password to be known only to the central authority from whom the locked token was issued and to whom the token must therefore be returned to be unlocked. This is inconvenient to the user whose token will remain out of action until reissued and can represent an expensive administrative overhead to the issuing authority.

The present invention accordingly seeks to provide a means for the unlocking of locked tokens which can avoid the need to return such tokens to their issuing authority while at the same time avoiding the possible dissemination of information useful for subverting their locking function.

SUMMARY OF THE INVENTION

In one aspect the invention resides in a system comprising a plurality of portable tokens issued for the use of respective user accounts, each such token being enabled to perform an operation for a respective user account in response to the input to the token of a respective valid password corresponding to said account but becoming inoperative in respect of said account in response to the repeated input of an invalid password or passwords; wherein each such token stores a common cryptographic function, a respective cryptographic key corresponding to the respective user account and random number (or other character sequence) generating means; and wherein each such token is arranged such that upon becoming inoperative as aforesaid: (i) a random character sequence is generated within and outputted from the token; (ii) said random character sequence is encrypted within the token in accordance with said function under said respective key; and (iii) said token is adapted to become operative again in respect of said account in response to the input to the token of a character sequence corresponding to the result of the aforesaid encryption of said random character sequence.

In another aspect the invention resides a method of rendering operative a token which has become inoperative as aforesaid in a system according to the first aspect of the invention, where the system comprises an authority storing said cryptographic function and the plurality of said respective cryptographic keys corresponding to the user accounts within the system, which method comprises: (i) transmitting from the user to the authority the random character sequence outputted from the token together with information identifying the user account; (ii) encrypting said random character sequence at the authority in accordance with said function under the respective key corresponding to that user account; (iii) transmitting from the authority to the user the result of the aforesaid encryption; and (iv) inputting that result to the token.

The invention also resides per se in an aforesaid token for use in the above-defined system and method.

The invention will be more particularly described, by way of example, with reference to the accompanying drawings.

DETAILED DESCRIPTION OF THE PREFERRED EMBODIMENT

Figure 1:
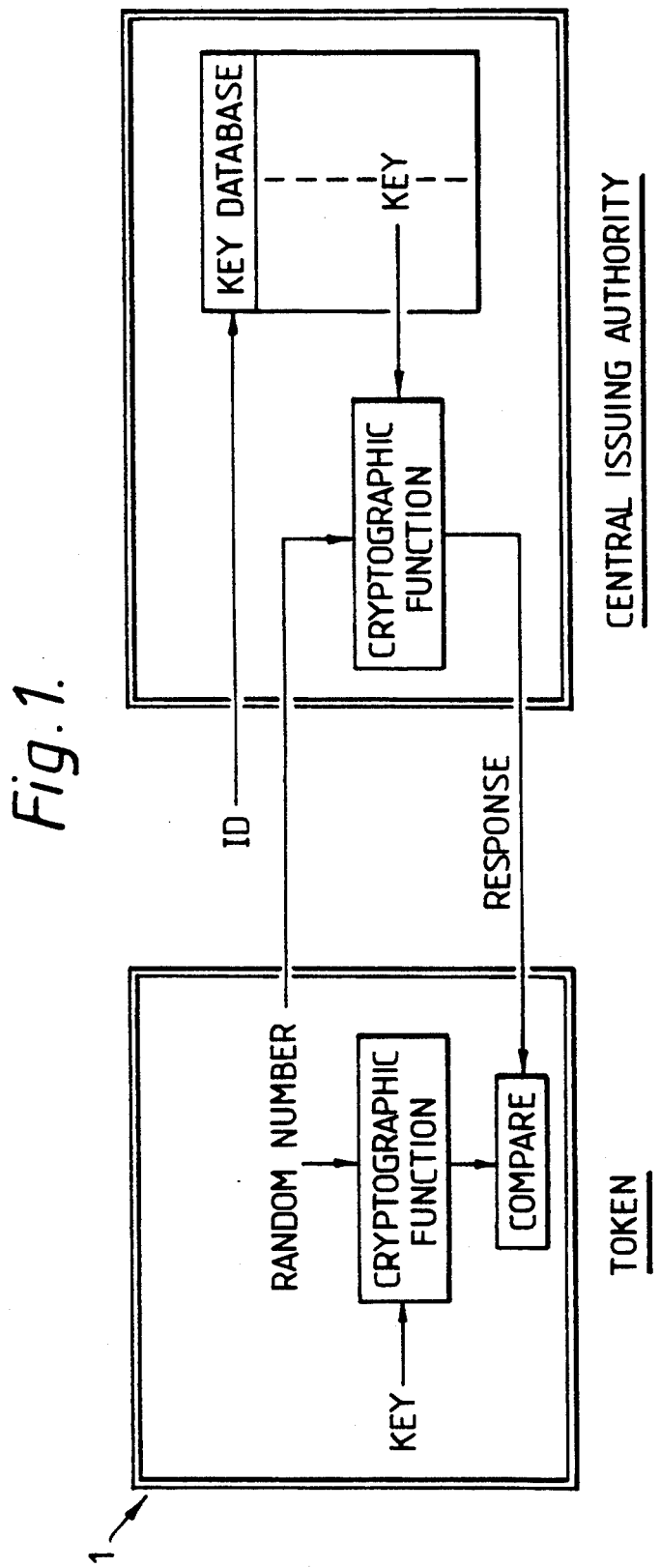
FIG. 1 is a diagramatic representation of the operation of one embodiment of the invention.
Figure 2:
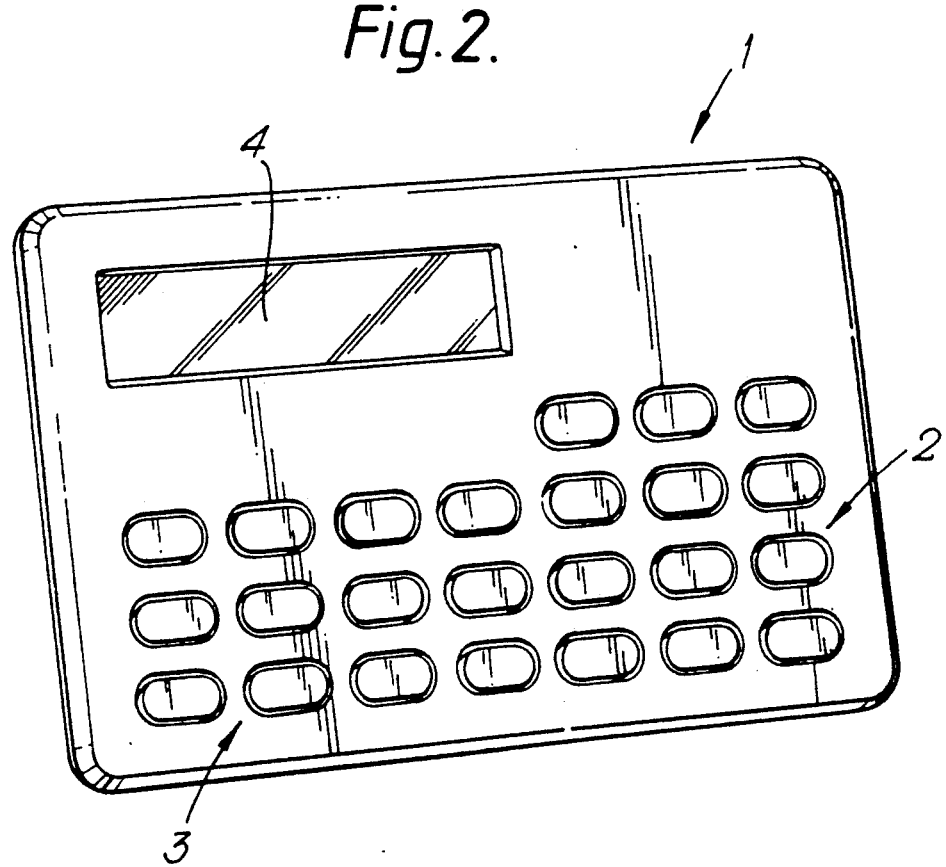
FIG. 2 is a perspective view of a typical token to which the invention may be applied.

The drawings depict at 1 one of a plurality of similar portable electronic tokens which are issued to respective users e.g. for the purpose of generating "digital signatures" for the authentication of payment instructions within an electronic banking network. As exemplified in FIG. 2, each such token is physically akin to a hand-held calculator with keypads 2 and 3 for the entry of data and commands and an associated display panel 4. The main function of the token need not, however, be described in detail herein and is not represented in FIG. 1 which is concerned only with the process of "unlocking" described below.

In practice the token can only be enabled to perform its proper function upon the entry of a valid password chosen for the user account for which it has been issued. In order to guard against the discovery of that password by unauthorised persons through repeated trial and error the token is programmed to become inoperative or "locked" after a predetermined small number of consecutive invalid password entries, in accordance with normal practice. It may well occur, however, that an authorised person will enter a wrong password a number of times by simple mistake, and thereby inadvertently cause the token to become locked. The remainder of this description is concerned with the process by which the token can be unlocked in such circumstances in accordance with the invention.

Each of the tokens stores a common cryptographic function, such as the Data Encryption Algorithm described in American National Standards Institute standard X3.92. This may be the same algorithm as is used for the main authentication function of the token. In addition, however, each token is initialised with a separate "unlocking" key for the algorithm which corresponds uniquely to the user account for which the token has been issued. Each token also stores a random number generator.

In the event that a token becomes locked as indicated above it will automatically generate a random number and indicate the same on its display. The same number is encrypted within the token under the respective unlocking 5 key but the result of this encryption is not displayed. The token is, however, programmed to unlock if the number corresponding to the result of the encryption—which we will term the "response" number—is then entered separately.

In order to derive the correct response number to unlock his token the user must contact the central authority from whom the tokens are issued. At that authority there is stored the same cryptographic function as in all of the tokens together with a database of all of the respective unlocking keys and corresponding user accounts the latter under conditions of high security. The locked-out user transmits to the central authority the random number which his token has displayed together with the identity of his account. At its discretion, the authority can then perform the same encryption on that number as occurs within the user's token, using the correct unlocking key selected from its database, and transmit the resultant response number to the user. In practice this interchange can be accomplished through a brief telephone call. The user then enters the response number into his token where it is compared with the result of the encryption performed internally and if the numbers agree the token is unlocked.

It will be appreciated that this unlocking process is extremely simple and quick and in particular avoids the need to return a locked token to the central issuing authority for attention. At the same time, however, it does not result in the release of any information useful for subverting the security of the system—even if the whole interchange between the locked user and the central authority should be overheard by an unauthorised person. Since a different random number and response are used each time the same token may become locked, and a different response will be given to the same random number from different locked tokens, knowledge of past response numbers will not assist in any subsequent unauthorised unlocking attempt.

Tokens in this system may in practice be shared physically between a number of different user accounts. In that case each account will have its own password and the token will be initialised with a corresponding number of respective unlocking keys. In the event of inadvertent incorrect password entry when the token is being used for one of the selected accounts that account will become locked (and the above process can be performed using the correct unlocking key corresponding to that account) but the operation of the token for the other accounts remains unaffected.

I claim:

1. A system comprising a plurality of portable tokens issued for the use of respective user accounts, each such token being enabled to perform an operation for a respective user account in response to the input to the token of a respective valid password corresponding to said account but becoming inoperative in respect of said account in response to the repeated input of an invalid password or passwords; wherein each such token stores a common cryptographic function, a respective cryptographic key corresponding to the respective user account and means for generating random character sequences; and wherein each such token is arranged such that upon becoming inoperative as aforesaid: (i) a random character sequence is generated within and outputted from the token; (ii) said random character sequence is encrypted within the token in accordance with said function under said respective key; and (iii) said token is adapted to become operative again in respect of said account in response to the input to the token of a character sequence corresponding to the result of the aforesaid encryption of said random character sequence.

2. A method for rendering operative a portable token in a system comprising a plurality of such tokens issued for the use of respective user accounts, wherein each such token is enabled to perform an operation for a respective user account in response to the input to the token of a respective valid password corresponding to said account, but becomes inoperative in respect of said account in response to the repeated input of an invalid password or passwords; and wherein each such token stores a common cryptographic function, a respective cryptographic key corresponding to the respective user account and means for generating random character sequences; and wherein each such token is arranged such that upon becoming inoperative as aforesaid: (i) a random character sequence is generated within and outputted from the token; (ii) said random character sequence is encrypted within the token in accordance with said function under said respective key; and (iii) said token is adapted to become operative again in respect of said account in response to the input to the token of a character sequence corresponding to the result of the aforesaid encryption of said random character sequence; the method comprising: (i) contacting a central authority responsible for storing said cryptographic function and the plurality of said respective cryptographic keys corresponding to the user accounts within the system; (ii) transmitting from the user of the token to the authority the random character sequence outputted from the token together with information identifying the user account; (iii) encrypting said random character sequence at the authority in accordance with said function under the respective key corresponding to that user account; (iv) transmitting from the authority to the user the result of the aforesaid encryption; and (v) inputting that result to the token.

3. A portable token for use in a system comprising a plurality of such tokens issued for the use of respective user accounts; said token being enabled to perform an operation for a respective user account in response to the input to the token of a respective valid password corresponding to said account but becoming inoperative in respect of said account in response to the repeated input of an invalid password or passwords; wherein said token stores a cryptographic function common to the tokens in the system, a respective cryptographic key corresponding to the respective user account and means for generating random character sequences; and wherein said token is arranged such that upon becoming inoperative as aforesaid: (i) a random character sequence is generated within and outputted from the token; (ii) said random character sequence is encrypted within the token in accordance with said function under said respective key; and (iii) the token is adapted to become operative again in respect of said account in response to the input to the token of a character sequence corresponding to the result of the aforesaid encryption of said random character sequence.

* * * * *